United States Patent
Maier et al.

(10) Patent No.: US 11,806,791 B2
(45) Date of Patent: Nov. 7, 2023

(54) METHOD FOR TURNING A WORKPIECE WITH A TOOL SYSTEM

(71) Applicant: CERATIZIT AUSTRIA GESELLSCHAFT M.B.H., Reutte (AT)

(72) Inventors: Hans Maier, Pflach (AT); Siegfried F. Kerle, Rieden (AT); Alfred Hofegger, Reutte (AT); Harald Urschitz, Reutte (AT); Einar Schurda, Ehrwald (AT)

(73) Assignee: CERATIZIT Austria Gesellschaft m.b.H, Reutte (AT)

( * ) Notice: Subject to any disclaimer, the term of this patent is extended or adjusted under 35 U.S.C. 154(b) by 22 days.

(21) Appl. No.: 17/717,704

(22) Filed: Apr. 11, 2022

(65) Prior Publication Data
US 2022/0234117 A1   Jul. 28, 2022

Related U.S. Application Data

(62) Division of application No. 16/956,694, filed as application No. PCT/EP2018/081849 on Nov. 20, 2018, now Pat. No. 11,396,051.

(30) Foreign Application Priority Data

Dec. 22, 2017   (EP) .................................... 17002075

(51) Int. Cl.
*B23B 29/04*   (2006.01)
*B23B 25/00*   (2006.01)
*B23B 27/16*   (2006.01)

(52) U.S. Cl.
CPC ........ *B23B 29/043* (2013.01); *B23B 27/1611* (2013.01); *B23B 2200/049* (2013.01);
(Continued)

(58) Field of Classification Search
CPC ..... B23B 29/04; B23B 27/1614; B23B 27/16; B23B 2200/0423; B23B 2200/161;
(Continued)

(56) References Cited

U.S. PATENT DOCUMENTS

| | | | |
|---|---|---|---|
| 1,629,667 A | 5/1927 | Knipple | ................ B23B 27/164 407/103 |
| 3,274,862 A | 9/1966 | Babich | .................... B23B 29/03 407/45 |

(Continued)

FOREIGN PATENT DOCUMENTS

| | | |
|---|---|---|
| CN | 1318004 A | 10/2001 |
| CN | 1758974 A | 4/2006 |

(Continued)

*Primary Examiner* — Sara Addisu
(74) *Attorney, Agent, or Firm* — Laurence A. Greenberg; Werner H. Stemer; Ralph E. Locher

(57) ABSTRACT

A tool system for machining includes a tool body that has a first end for connecting to a machine tool and a second end having an end face on which a seat for an interchangeable cutting insert is formed. The cutting insert has an underside formed as an abutment surface, a top side formed as a rake face, and an encircling side face formed as a flank, and a cutting edge is formed at a transition from the top side to the encircling side face. The cutting insert is arranged on the seat such that the top side extends perpendicularly to the longitudinal axis of the tool body and the cutting edge protrudes beyond the outer circumference of the end face of the tool body in a radial direction with respect to the longitudinal axis with two usable cutting corners and cutting-corner portions adjoining the latter on both sides.

9 Claims, 9 Drawing Sheets

(52) U.S. Cl.
CPC ... *B23B 2200/161* (2013.01); *B23B 2200/165* (2013.01); *B23B 2205/12* (2013.01)

(58) Field of Classification Search
CPC .......... B23B 2200/165; B23B 2205/12; B23B 27/1611; B23B 27/007; B23B 2200/048; B23B 2200/049; B23B 29/043; B23B 1/00; Y10T 407/1946
See application file for complete search history.

(56) References Cited

U.S. PATENT DOCUMENTS

| | | | | |
|---|---|---|---|---|
| 3,629,919 | A | 12/1971 | Trevarrow, Jr. | ......... B23B 27/06 407/103 |
| 4,209,047 | A | 6/1980 | Weill | ................... B23B 27/164 407/103 |
| 4,621,955 | A | 11/1986 | Briese | ................... B23C 5/2204 407/103 |
| 5,607,263 | A | 3/1997 | Nespeta | ................ B23B 27/007 407/53 |
| 5,810,518 | A | 9/1998 | Wiman | ................ B23B 27/065 407/102 |
| 5,924,826 | A * | 7/1999 | Bystrom | ............... B23B 29/046 407/103 |
| 5,931,613 | A * | 8/1999 | Larsson | .................. B23B 27/08 407/103 |
| 6,146,060 | A | 11/2000 | Rydberg | ..................... B23C 5/10 407/103 |
| 6,332,385 | B1 | 12/2001 | Kautto et al. | |
| 6,715,386 | B2 * | 4/2004 | Maier | ..................... B23B 3/164 82/159 |
| 6,896,450 | B2 | 5/2005 | Rothenstein | ........... B23D 77/02 408/239 R |
| 7,219,584 | B2 * | 5/2007 | Edler | .................... B23B 29/242 82/159 |
| 9,352,402 | B2 | 5/2016 | Luik | ....................... B23C 5/006 |
| 9,475,132 | B2 | 10/2016 | Kocherovsky | .......... B23C 5/202 |
| 9,776,251 | B2 | 10/2017 | Okida et al. | |
| 10,751,814 | B2 | 8/2020 | Kemmler | ................... B23C 5/10 |
| 11,396,051 | B2 * | 7/2022 | Maier | ...................... B23B 1/00 |
| 11,597,017 | B2 * | 3/2023 | Stjernstedt | ................ B23B 1/00 |
| 2002/0170396 | A1 * | 11/2002 | Maier | ..................... B23B 3/164 82/159 |
| 2004/0161312 | A1 | 8/2004 | Hole | .................... B23B 27/007 407/101 |
| 2004/0265074 | A1 | 12/2004 | Hessman et al. | |
| 2005/0047885 | A1 | 3/2005 | Hyatt | ....................... B23B 1/00 409/165 |
| 2006/0110227 | A1 | 5/2006 | Kruszynski | ............. B23B 51/00 408/230 |
| 2006/0111019 | A1 * | 5/2006 | Hyatt | ...................... B23B 27/14 451/6 |
| 2008/0232909 | A1 | 9/2008 | Filho | ........................ B23B 1/00 407/7 |
| 2008/0232911 | A1 | 9/2008 | Hyatt et al. | |
| 2009/0185873 | A1 | 7/2009 | Noureddine | ............ B23B 29/04 407/42 |
| 2011/0013935 | A1 | 1/2011 | Hecht | |
| 2011/0013995 | A1 | 1/2011 | Hecht | |
| 2011/0106105 | A1 | 5/2011 | Mergenthaler | |
| 2011/0142562 | A1 | 6/2011 | Sturges | |
| 2012/0201616 | A1 | 8/2012 | Hecht | .................... B23B 27/007 407/120 |
| 2014/0227051 | A1 | 8/2014 | Hecht | ..................... B23B 29/06 407/103 |
| 2014/0294525 | A1 | 10/2014 | Hecht | |
| 2015/0290717 | A1 | 10/2015 | Hecht | ................. B23B 27/1662 407/103 |
| 2016/0082524 | A1 | 3/2016 | Bonhomme | ........... E21B 10/42 407/115 |
| 2017/0320143 | A1 | 11/2017 | Lof | |
| 2019/0084053 | A1 | 3/2019 | Vöge | ....................... B23B 27/04 |
| 2020/0215628 | A1 | 7/2020 | Kanz | ..................... B23D 13/00 |
| 2020/0324345 | A1 * | 10/2020 | Maier | ................. B23B 27/1611 |
| 2021/0008635 | A1 * | 1/2021 | Stjernstedt | .............. B23B 27/16 |
| 2021/0016363 | A1 | 1/2021 | Ando | .................... B23B 29/043 |
| 2022/0241870 | A1 * | 8/2022 | Tohkairin | ................ B23B 27/02 |
| 2022/0347761 | A1 * | 11/2022 | Kondou | .................. B23B 27/04 |
| 2023/0015428 | A1 * | 1/2023 | Singer-Schnoeller | ...................... B23B 27/1681 |

FOREIGN PATENT DOCUMENTS

| | | | |
|---|---|---|---|
| CN | 102056692 A | 5/2011 | |
| CN | 106794524 A | 5/2017 | |
| DE | 102006055277 A1 | 5/2008 | .......... B23B 27/007 |
| EP | 1260294 B1 | 7/2005 | |
| EP | 1702703 A1 * | 9/2006 | ........ B23B 27/1611 |
| EP | 1415742 A1 | 5/2014 | |
| EP | 2805786 A1 | 11/2014 | ............. B23C 5/207 |
| EP | 3536427 A1 * | 9/2019 | .............. B23B 1/00 |
| JP | H01166003 U | 11/1989 | |
| JP | H11254207 A | 9/1999 | |
| JP | 2002370102 A | 12/2002 | |
| JP | 2004148498 A | 5/2004 | |
| JP | 2011506111 A | 3/2011 | |
| JP | 2016515477 A | 5/2016 | |
| KR | 1020100015820 A | 2/2010 | |
| KR | 1020150133202 A | 11/2015 | |
| RU | 1774902 A1 | 11/1992 | |
| RU | 1600192 A1 | 3/1995 | |
| RU | 2039636 C1 | 7/1995 | |
| RU | 85383 U1 | 8/2009 | |
| SU | 1618510 A | 1/1991 | |
| WO | 2004022270 A1 | 3/2004 | |
| WO | WO-2004022270 A1 * | 3/2004 | .............. B23B 1/00 |
| WO | 2006028866 A2 | 3/2006 | |
| WO | 2008118835 A1 | 10/2008 | |
| WO | 2014024862 A1 | 2/2014 | |

* cited by examiner

METHOD FOR TURNING A WORKPIECE WITH A TOOL SYSTEM

CROSS-REFERENCE TO RELATED APPLICATION

This application is a divisional of patent application Ser. No. 16/956,694, filed Jun. 22, 2020; which was a § 371 national stage filing of international application No. PCT/EP2018/081849, filed Nov. 20, 2018, which designated the United States; this application also claims the priority, under 35 U.S.C. § 119, of European patent application No. EP 17002075.4, filed Dec. 22, 2017; the prior applications are herewith incorporated by reference in their entirety.

FIELD AND BACKGROUND OF THE INVENTION

The present invention relates to a tool system for turning machining and a method for turning a workpiece.

For machining by turning, in particular of metallic materials, use is made in many cases of tools in which a tool body, which is for example customarily formed from steel, has arranged thereon an interchangeable cutting insert on which there are formed the cutting edge portions coming into engagement with the material to be machined. Here, the cutting insert which is used is customarily formed from a considerably harder and more wear-resistant material, such as for example hard metal (cemented carbide), cermet or a cutting ceramic. Here, the cutting insert can have for example one cutting corner, which can be used for the machining, with cutting edge portions adjoining the latter, or a plurality of usable cutting corners.

The turning operation typically makes use here of the tool system, in particular so-called monoblock holders, in which an upper side, designed as rake face, of the interchangeable cutting insert extends in a plane which runs at least substantially parallel to a longitudinal axis of the tool body bearing the cutting insert, with the result that the tool reference plane in accordance with DIN 6581 is also oriented at least substantially parallel to the longitudinal axis of the tool body.

By contrast thereto, EP 1 260 294 B1, corresponding to U.S. Pat. No. 6,715,386, describes a tool system for turning in which a plurality of interchangeable cutting inserts are arranged on a tool body designed as a tool head in such a way that the respective upper sides, designed as rake faces, of the cutting inserts each extend substantially perpendicularly to a longitudinal axis of the tool head that is formed as an axis of rotation D, with the result that the assigned tool reference planes Pr of the cutting inserts also run perpendicularly to the longitudinal axis. Although the tool system described in EP 1 260 294 B1 provides a particularly large variety of machine possibilities, the relatively high space requirement of the tool system has proven not to be optimal in some applications.

SUMMARY OF THE INVENTION

It is an object of the present invention to provide an improved tool system for turning machining and an improved method for turning a workpiece that, in combination with small space requirement in a machine tool, allow a wide variety of different machining operations.

The object is achieved by a tool system for turning machining as claimed in the independent tool system claim. Advantageous developments are specified in the dependent claims.

The tool system has a tool body which extends along a longitudinal axis and has a first end for connecting to a machine tool and a second end with an end face on which there is formed a seat for an interchangeable cutting insert, and an interchangeable cutting insert fastened to the seat in a rotationally fixed manner. The cutting insert has an underside designed as a bearing face, an upper side designed as a rake face, and a peripheral lateral face designed as a flank. A cutting edge is formed at a transition from the upper side to the peripheral lateral face. The cutting insert is arranged on the seat in such a way that the upper side extends perpendicularly to the longitudinal axis of the tool body, and the cutting edge projects in the radial direction with respect to the longitudinal axis beyond the outer circumference of the end face of the tool body by way of at least two usable cutting corners and cutting edge portions adjoining the latter on both sides. The at least two usable cutting corners have at least one first cutting corner and one second cutting corner different than the first cutting corner. By virtue of the orientation of the upper side of the cutting insert perpendicular to the longitudinal axis of the tool body and the at least two different usable cutting corners projecting in the radial direction, it is possible, by rotation the tool body about its longitudinal axis, to realize different turning operations in a simple and particularly compact manner without another cutting insert having to be brought into a machining position. Since the different cutting corners are formed on the same cutting insert, the tool system is also particularly compact by comparison with known tool systems and requires only very little installation space in the machine. By virtue of the rotationally fixed fastening of the cutting insert to the tool body, it is also possible for the setting angle at which the cutting edge portions in engagement are oriented relative to the workpiece to be reliably changed in a simple manner, with the result that it is possible to switch between orientations for different machining operations. Here, the second cutting corner can differ in a wide variety of ways from the first cutting corner. Here, it can differ for example only in one specific feature, such as for example the corner angle, a corner radius, etc., from the first cutting corner or else in a plurality of features, such as for example a corner radius and the angle and/or the width of a reinforcing bevel running along the cutting corner, a different chip geometry, etc. A corresponding design of the cutting corners makes it possible, with only one tool body and a cutting insert fastened thereon, to carry out for example longitudinal turning, copy turning and also facing operations in any desired direction.

According to a development, the first cutting corner and the second cutting corner differ from one another in one or more of the following features: a corner angle, a corner configuration, a clearance angle, an angle and/or a width of a reinforcing bevel running along the cutting corner, a chip geometry structure formed on the rake face, a material and/or a hard substance coating, applied thereto, of the cutting insert in the region of the cutting corners, of a machining operation for which the cutting corner is designed. It is possible in this way, by targeted rotation of the tool body about its longitudinal axis by a predetermined angle, to change the machining conditions in a targeted manner, for example between rough machining and finish machining, between longitudinal turning with high feed rates and fine machining of a certain workpiece contour, etc. It is immediately evident that a large number of combination possibilities exists. With a different corner configuration, the corner radius can be different for example, with the result that, for example, steps with different transition radii can be generated on the workpiece to be machined. Differences in the chip geometry structure can be used for example for machining with different cutting depths or different feed rates. Different materials of the cutting insert on the different corners or different coatings on the different corners can be used for example for different types of machining or for example, inter alia, also for regions with different materials on the workpiece. In one design for different machining operations, it is possible for example for one cutting corner to be designed for turning and another to be designed for groove turning or for thread turning. Furthermore, it is for example also possible to design one or more of the cutting corners for external machining and one or more other cutting corners for internal machining. It is immediately evident that a large number of combination possibilities exists.

According to a development, the underside of the cutting insert has at least one anti-rotation safeguarding element which interacts in a form-fitting manner with a complementary anti-rotation safeguarding element on the end face of the tool body. In this case, there is provided a reliable, rotationally fixed fastening of the cutting insert to the tool body that allows a targeted change of the machining conditions, and the peripheral flank can be kept free of fastening structures for rotationally fixed fastening over the entire circumference of the cutting insert. Therefore, it is made possible in this case, with reliable rotationally fixed fastening of the cutting insert, to use the entire circumference of the cutting insert for machining. The anti-rotation safeguarding element on the cutting insert can be formed for example as a structure projecting from the underside of the cutting insert, and the complementary anti-rotation safeguarding element on the end face of the tool body can be formed as a correspondingly recessed structure. On the other hand, for example, the anti-rotation safeguarding element on the end face of the tool body can also be formed as a projecting structure, and the complementary anti-rotation safeguarding element on the underside of the cutting insert can be formed as a corresponding recessed structure.

According to a development, the underside of the cutting insert has at least one centering element which interacts in a form-fitting manner with the end face of the tool body in order to position the cutting insert with respect to the longitudinal axis of the tool body. In this case, particularly simple and reliable mounting of the cutting insert on the tool body is possible. The centering element can be formed for example by a projection on the underside of the cutting insert, in particular for example by a projection which is conical or tapers in some other way with increasing distance from the underside, said projection interacting with a recess of complementary form in the end face of the tool body. On the other hand, the centering element can for example also be formed by a corresponding recess in the underside of the cutting insert that interacts with a corresponding projection on the end face of the tool body. Furthermore, it is possible that an anti-rotation safeguarding element is formed in such a way that it simultaneously serves as a centering element.

According to a development, the underside of the cutting insert and the end face of the tool body are formed in such a way that the cutting insert can be fastened to the tool body only in precisely one predetermined orientation. This allows particularly simple and convenient use in which it is ensured that the cutting insert is not inadvertently improperly mounted and that the cutting corners are oriented on the tool body in the orientation intended therefor. The confinement to only the predetermined orientation can be realized for example by a corresponding asymmetrical configuration of mutually complementary anti-rotation safeguarding elements on the end face of the tool body and on the underside of the cutting insert.

According to a development, a basic shape of the end face of the tool body corresponds substantially with a basic shape of the cutting insert. It is ensured in this case that the cutting insert can be sufficiently freed up circumferentially over at least the most part of the circumference in order to allow turning with at least the most part of the circumference of the upper side without thereby requiring additional tilting of the longitudinal axis of the tool body.

According to a development, the cutting edge is formed along the entire peripheral lateral face and projects over the entire circumference in the radial direction beyond the outer circumference of the end face of the tool body. In this case, the entire circumference of the upper side of the cutting insert can be used for turning machining in a simple manner by virtue of the tool body being rotated under targeted control about its longitudinal axis and, where appropriate, being moved linearly in the plane perpendicular to the workpiece axis.

According to a development, the lateral face has a positive cutting insert-specific clearance angle over the entire circumference of the cutting insert. It is ensured in this case that the peripheral lateral face serving as a flank during the turning operation is sufficiently freed up over the entire outer circumference, with the result that no additional tilting of the longitudinal axis of the tool body is necessary that would further complicate the activation of the tool body. It should be noted that the cutting insertion-specific clearance angle here does not have to be constant over the entire circumference of the cutting insert, but the lateral face can also have different clearance angles in different portions.

The object is achieved by a method for turning a workpiece as claimed in the independent method claim. Advantageous developments result from the dependent claims.

The method occurs with a tool system in which an interchangeable cutting insert is arranged on an end face of a tool body in a rotationally fixed manner in such a way that an upper side designed as a rake face is oriented perpendicular to a longitudinal axis L of the tool body, and a cutting edge formed between the upper side and a peripheral lateral face projects in the radial direction with respect to the longitudinal axis beyond the outer circumference of the end face of the tool body by way of at least two usable cutting corners and cutting edge portions adjoining the latter on both sides. The method comprises the following steps:

Rotating the workpiece about a workpiece axis Z,

Machining a surface of the workpiece with one of the cutting corners in such a way that the chips generated run off on the upper side of the cutting insert, Changing the chip formation by controlled rotation of the tool body about its longitudinal axis and translational movement, coordinated therewith, of the tool body in a plane XZ, which runs perpendicularly to the longitudinal axis L, with a translational movement component in a direction perpendicular to the workpiece axis Z.

By virtue of the controlled rotation of the tool body about its longitudinal axis and the translational movement, coordinated therewith, of the tool body in the plane perpendicular to the longitudinal axis with a translational movement component perpendicular to the workpiece axis Z, it is possible during the turning operation to change the machining conditions particularly simply in a controlled manner. It is possible for example to change the setting angle of the cutting edge engaged in a targeted manner without changing the cutting depth, or another cutting edge portion or another cutting corner having different features can be used. Since the interchangeable cutting insert is fastened to the tool body in a rotationally fixed manner and projects beyond the outer circumference of the tool body by way of at least two cutting corners which can be used for machining, it is possible here to realize different machining conditions in a particularly compact arrangement with a single cutting insert. Here, the controlled rotation of the tool body with translational movement, coordinated therewith, of the tool body, allows the machining conditions to be changed without interrupting the machining.

According to a development, the longitudinal axis L of the tool body is oriented in the plane XY perpendicular to the workpiece axis Z. In this case, a change in the setting angle of the cutting edge portion in engagement with the workpiece and the use of different cutting corners can occur in a particularly simple manner in terms of control. With particular preference, the longitudinal axis L of the tool body can be oriented parallel to the Y axis of the turning operation.

According to a development, the at least two usable cutting corners have a first cutting corner and a second cutting corner different than the first cutting corner. As has already been described above with respect to the tool system, it is possible here for the first cutting corner and the second cutting corner to differ from one another for example only in one feature or else in a plurality of features.

According to a development, the controlled rotation of the tool body about its longitudinal axis and the translational movement, coordinated therewith, occur in such a way that a setting angle of an active machining cutting edge is changed. Here, the activation can for example preferably occur in such a way that only the setting angle is changed without changing further machining parameters. In this case, for example, longitudinal turning with a relatively flat setting angle can occur and, upon approaching a step in the workpiece, the setting angle can be increased. It should be noted that this is only one possible machining operation and also additional other machining operations can be provided.

According to a development, the controlled rotation of the tool body and the translational movement, coordinated therewith, occur in such a way that, during the machining, a workpiece contour remains unchanged. In this case, it is possible for example, without interrupting the cutting, to change the setting angle of the cutting edge in engagement with the workpiece in a simple manner during the turning operation. It should be noted that this is turn is only one of the possible operations and, apart from the latter, for example additionally other turning operations can also be allowed in which, for example, the cutting depth can also be changed.

If, during the machining, the active cutting corner is arranged in a plane which contains the workpiece axis Z, the machining conditions can be changed in a particularly simple manner by rotating the tool body about its longitudinal axis.

The object is also achieved by the use of a cutting insert as claimed in the independent cutting insert claim. The cutting insert has an upper side designed as a rake face, an underside designed as a bearing face, a peripheral lateral face serving as a flank, and a cutting edge, which is formed between the upper side and the peripheral lateral face, with at least two cutting corners which can be used for machining and cutting edge portions adjoining the latter on both sides in each case. The cutting insert is used in an above-described method for chip-removing turning. The use of the cutting insert achieves the advantages described above with respect to the method. In particular, it is possible for example to realize different turning operations, such as for example longitudinal turning, facing and copy turning, with only one tool body and a cutting insert arranged thereon.

According to a development, the underside of the cutting insert has at least one anti-rotation safeguarding element which interacts in a form-fitting manner with a complementary anti-rotation safeguarding element on the end side of the tool body. In this case, there is provided reliable, rotationally fixed fastening of the cutting insert to the tool body that allows a targeted change of the machine conditions, and the peripheral flank can be kept free of fastening structures for rotationally fixed fastening over the entire circumference of the cutting insert.

According to a development, the underside of the cutting insert has at least one centering element which interacts in a form-fitting manner with the end face of the tool body in order to position the cutting insert with respect to the longitudinal axis of the tool body. In this case, particularly simple and reliable mounting of the cutting insert on the tool body is made possible.

Further advantages and expedient aspects of the invention will emerge on the basis of the following description of exemplary embodiments with reference to the appended figures.

DETAILED DESCRIPTION OF THE INVENTION

Figure 1:
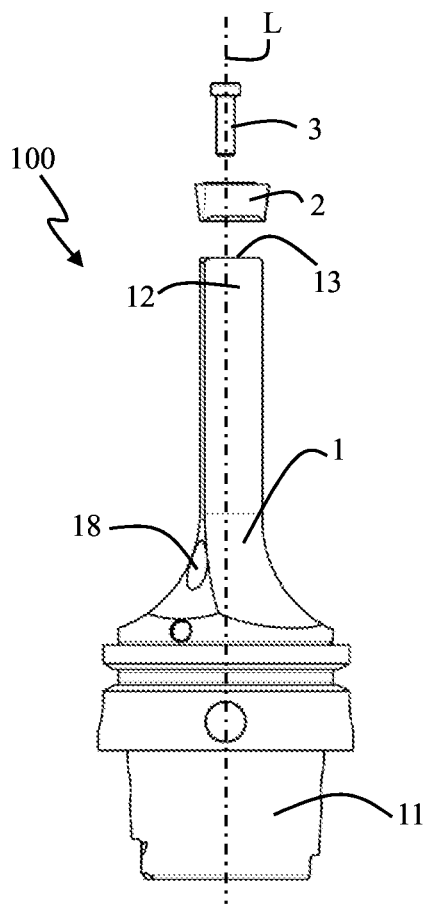
FIG. 1 shows a schematic exploded illustration in side view of a tool system according to one embodiment.
Figure 2:
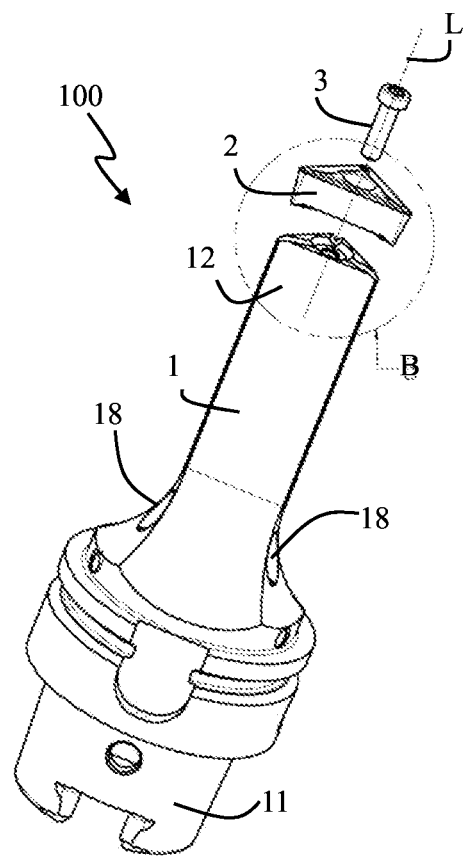
FIG. 2 shows a schematic perspective exploded illustration of the tool system from FIG. 1.

One embodiment of a tool system for turning machining is described below with reference to FIG. 1 to FIG. 9.

The tool system 100 schematically illustrated in the figures is designed for turning machining of in particular metallic materials and has a tool body 1 and an interchangeable cutting insert 2 which is fastened thereto in a rotationally secure and centered manner. The cutting insert 2 is formed from a hard and wear-resistant material and can be formed in particular from hard metal (cemented carbide), cermet or a cutting ceramic. In the embodiment, the tool body 1 is manufactured from a tougher material, such as for example a tool steel. However, it is also possible for example to form the tool body 1 from hard metal (cemented carbide), a cermet or other materials.

The tool body 1 extends along a longitudinal axis L and has a first end 11, which is designed for fastening to a machine tool, and a second end 12 having an end face 13 extending transversely with respect to the longitudinal axis L. The first end 11 is designed for reception in a tool receptacle (not shown) of the machine tool and can be designed for example for reception in a commercially available standard receptacle. In the preferred configuration that is illustrated, the tool body 1 has an inner coolant guide which is designed to channel coolant from an inner coolant-receiving opening at the first end 11 to a plurality of coolant outlet openings 18. The coolant outlet openings 18 are designed such that coolant can emerge in the direction of the second end 12 and of the interchangeable cutting insert 2 arranged thereon.

As can be seen in the figures, the tool body 1 is formed as a tool shank at its second end 12 and, in a section perpendicular to the longitudinal axis L, has substantially the same cross-sectional shape as the cutting insert 2, as will be described in more detail below. The region at the second end 12 that is formed as a tool shank with this cross-sectional shape extends here over at least a tenth of the total length of the tool body 1. A seat 14 for the rotationally secure fastening of the cutting insert 2 is formed on the end face 13 extending transversely with respect to the longitudinal axis L. The seat 14 is provided with a threaded bore 16 for receiving the threaded portion of a fastening screw 3 which serves to fasten the interchangeable cutting insert 2 to the seat 14. In the embodiment, the threaded bore 16 extend coaxially to the longitudinal axis L, which is advantageous from points of view of stability; however, an eccentric arrangement of the threaded bore 16 is also possible.

Figure 3:
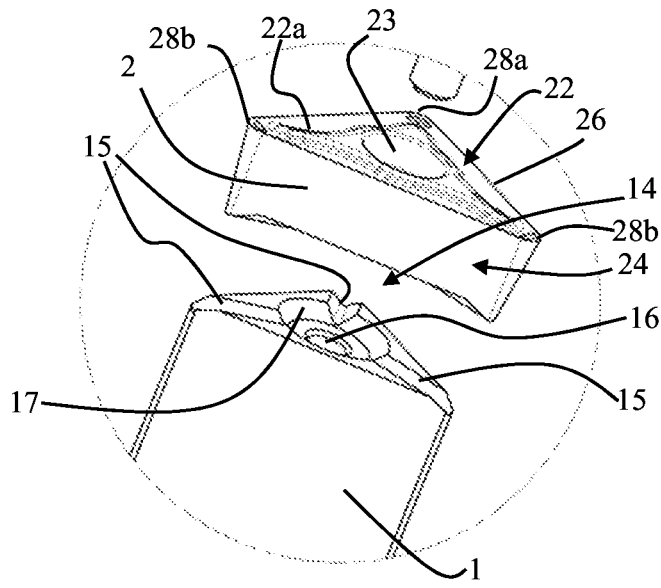
FIG. 3 shows a schematic detail illustration of a detail B from FIG. 2.

To allow the rotationally secure fastening of the cutting insert 2, the seat 14, as can be seen in particular in FIG. 3, has a plurality of anti-rotation safeguarding elements 15 which are designed to interact with complementary anti-rotation safeguarding elements 25 on an underside 21, designed as a bearing face, of the cutting insert 2. Although three such anti-rotation safeguarding elements 15 are provided in the embodiment, it is also possible for example for only one or two or else more than three such anti-rotation safeguarding elements 15 to be provided. In the embodiment illustrated, the anti-rotation safeguarding elements 15 on the seat 14 are designed as recessed grooves which each extend radially outward in a direction from the center of the end face 13. In the embodiment, the anti-rotation safeguarding elements 25 on the underside 21 of the cutting insert 2, which are complementary to the anti-rotation safeguarding elements 15 on the seat 14, are designed as ribs which project from the underside 21 and which run radially outward from a center of the underside 21. Although, in the embodiment, the anti-rotation safeguarding elements 25 are designed as projecting ribs, and the anti-rotation safeguarding elements 15 on the seat 14 are designed are recessed grooves, a reversed configuration is also possible, for example. Furthermore, it is also not essential that the number of the anti-rotation safeguarding elements designed as projecting ribs corresponds exactly with the number of the complementary anti-rotation safeguarding elements designed as recessed grooves. In the embodiment, by virtue of their arrangement, the anti-rotation safeguarding elements 25 serve simultaneously as centering elements for centering the cutting insert 2 on the seat 14.

Although, in the embodiment, anti-rotation safeguarding elements 25 are shown that serve simultaneously as centering elements, it is also possible for example to decouple these functionalities and provide at least one anti-rotation safeguarding element and at least one centering element separately from one another.

Figure 4:
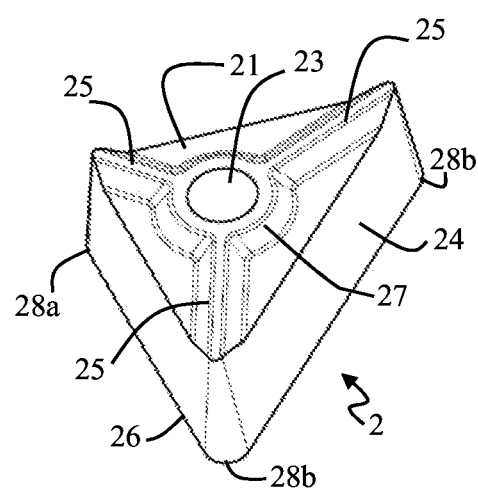
FIG. 4 shows a schematic perspective illustration of the underside of the cutting insert in the embodiment.
Figure 5:
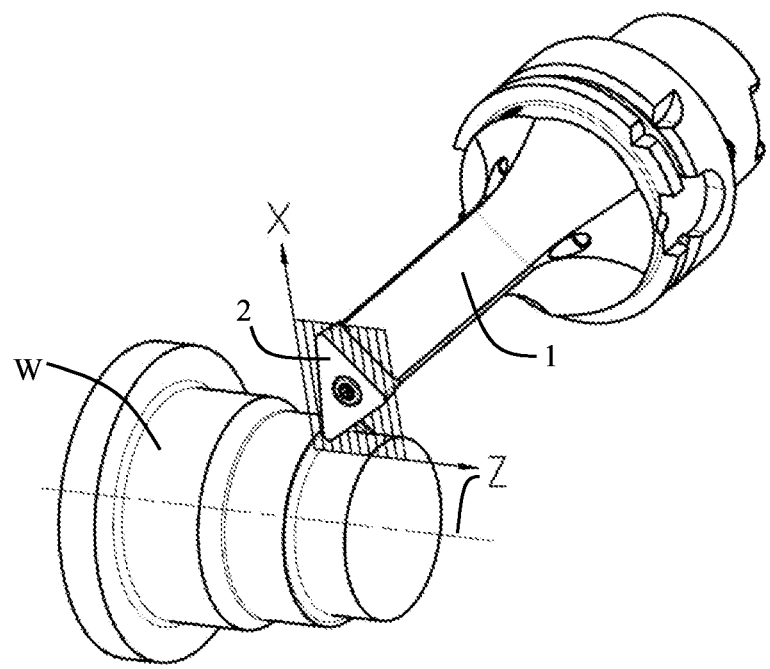
FIG. 5 shows a schematic perspective illustration of the tool system during the turning machining of a workpiece.
Figure 6:
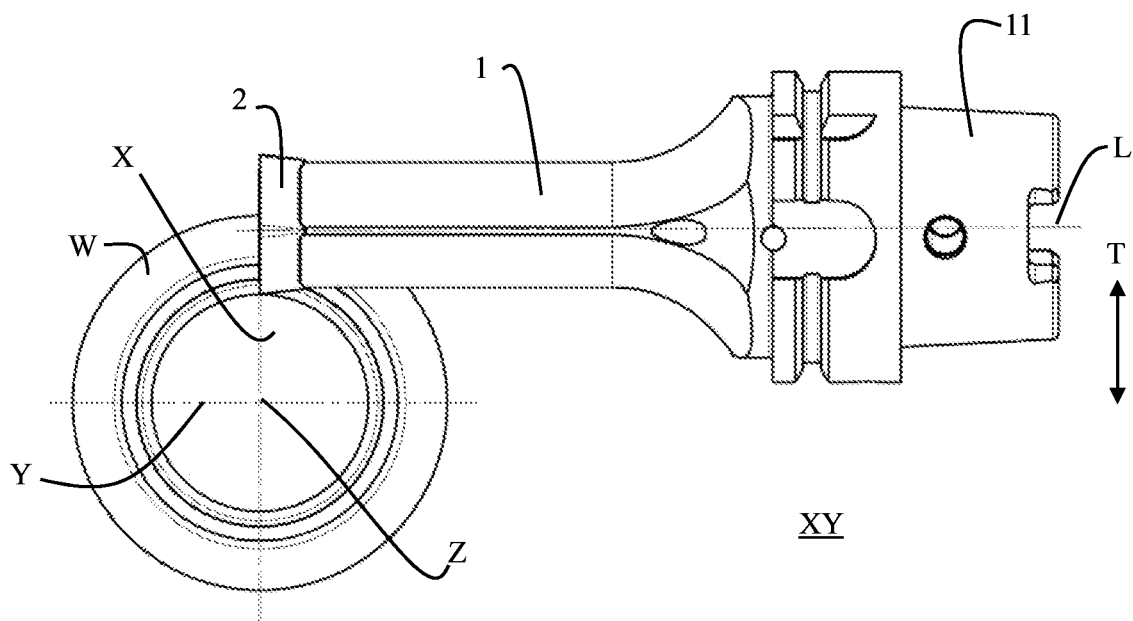
FIG. 6 shows a schematic illustration of the tool system during the turning machining of a workpiece with a direction of view along the workpiece axis.
Figure 7:
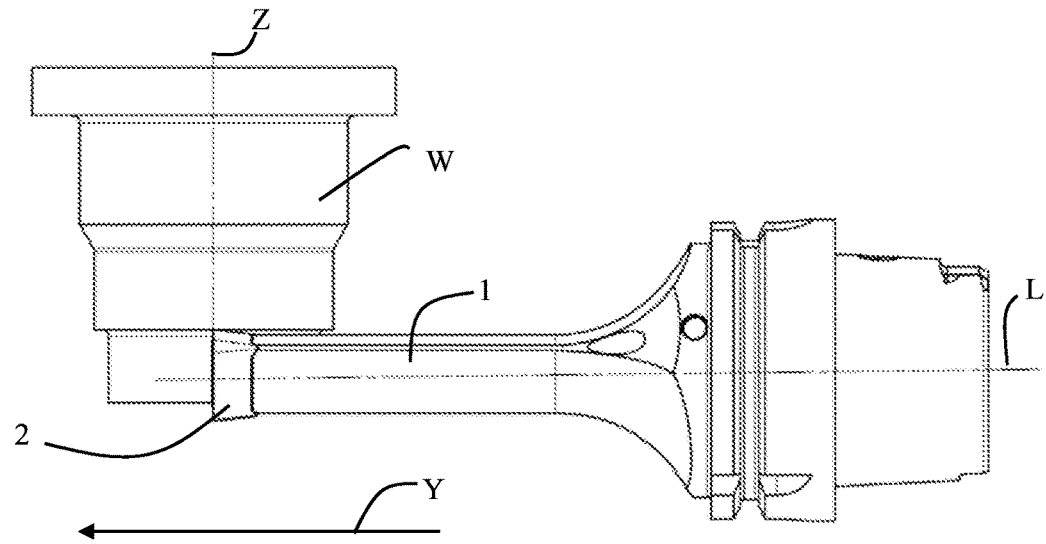
FIG. 7 shows an illustration, corresponding to FIG. 5, with a direction of view perpendicular to the workpiece axis and perpendicular to the longitudinal axis of the tool body.

As can be seen in particular in FIG. 4, the underside 21 of the cutting insert 2 has further still a central projection 27 which surrounds a through-hole 23 through which the threaded portion of the fastening screw 3 can be guided. The central projection 27 tapers with increasing distance from the underside of the cutting insert 2 and can, for example, taper conically in particular. The central projection 27 engages in a corresponding structure 17 on the seat 14, said structure being formed in the embodiment as a depression which surrounds the threaded bore 16 and which has a shape complementary to the central projection 27.

In the embodiment, the underside 21 of the cutting insert 2 and the end face 13 of the tool body 1 are designed in such a way that the cutting insert 2 can be fastened to the tool body 1 only in one precisely predetermined orientation. In the configuration illustrated, this is realized by an asymmetrical arrangement of the anti-rotation safeguarding elements 15 and 25 in the circumferential direction with respect to the threaded bore 16 or the through-hole 23.

The cutting insert 2 has an upper side 22, which is situated opposite the above-described underside 21 and designed as a rake face, and a peripheral lateral face 24 designed as a flank. As can be seen in FIG. 3, the rake face is provided with a chip geometry structure 22a for forming, conducting away and breaking chips arising during the turning operation. A cutting edge 26 is formed at the transition of the upper side 22 to the peripheral lateral face 24. The cutting edge 26 has a plurality of cutting corners 28 with cutting edge portions adjoining the latter on both sides in each case. The cutting corners are referred to below jointly as cutting corners 28, with individual cutting corners being referred to for example as first cutting corner 28a, second cutting corner 28b, etc. In the embodiment illustrated, the cutting edge 26 extends over the entire circumference of the cutting insert 2 as a cutting edge which can be used for turning. Alternatively thereto, the transition from the upper side 22 to the peripheral lateral face 24, for example even only over a part of the circumference, can be formed as a cutting edge 26 which can be used for the machining.

As can be seen in the figures, the upper side 22 of the cutting insert 2 extends perpendicular to the longitudinal axis L of the tool body 1 if the cutting insert 2 has been fastened to the tool body 1. Although the cutting insert 2 in the illustrated embodiment has three cutting corners 28, it is also possible for example to provide only two or more than three cutting corners 28, which can be used for turning, with cutting edge portions adjoining the latter.

In the embodiment, the cutting insert 2 has two different types of cutting corners 28, as can be seen in the figures. In the embodiment illustrated in FIG. 1 to FIG. 9, a second cutting corner 28b differs from a first cutting corner 28a, which has a first corner angle κ1, in that the cutting edge portions adjoining the second cutting corner 28b on both sides enclose with one another a second corner angle κ2 which is different than the first corner angle κ1. The cutting edge 26 projects in the radial direction with respect to the longitudinal axis L beyond the outer circumference of the end face 13 of the tool body 1 by way of at least two cutting corners 28 which can be used for turning. In the concretely illustrated preferred configuration, the cutting edge 26 projects over the entire circumference of the cutting insert 2 in the radial direction beyond the end face 13 of the tool body 1.

In the exemplary embodiment, the peripheral lateral face 24 has a positive cutting insert-specific clearance angle over the entire circumference of the cutting insert 2, with the result that the lateral face 24 approaches the longitudinal axis L over the entire circumference with increasing distance form the upper side 22. Here, the cutting insert-specific clearance angle can be constant over the entire circumference, but it can also assume different values in different regions.

The use of the above-described tool system 100 in a method for turning a workpiece W will be described below with reference to FIG. 5 to FIG. 9.

In the method, the workpiece W is clamped in a machine tool in such a way that it is rotated about a workpiece axis Z. In the exemplary embodiment, the longitudinal axis L of the tool body 1 is oriented in such a way that it is situated in a plane XY which runs perpendicular to the workpiece axis Z. In concrete terms, in the embodiment the longitudinal axis L runs parallel to the Y axis. The cutting corner 28 situated in an active machining position is arranged in a plane which contains the workpiece axis Z, as can be seen in particular in FIG. 6 and FIG. 7, with the result that the upper side 22 of the cutting insert that extends perpendicular to the longitudinal axis L of the tool body 1 is used as a rake face. During the turning machining, for example first of all the first cutting corner 28a with the first corner angle κ1 is then brought into an active cutting position in which a cutting edge portion adjoining the first cutting corner 28a on one side is used as a first setting angle κ1 for turning if the tool body is moved in a main movement direction B parallel to the workpiece axis Z. Controlled rotation of the tool body 1 about its longitudinal axis L allows the setting angle κ1 to be reduced for example in order to make possible longitudinal turning at a high feed rate, or the setting angle κ1 can be increased to, for example, 90° if for example a shoulder is intended to be produced, in order to machine its sidewall. Here, the rotation of the tool body 1 about its longitudinal axis L brings about a change in the chip formation. In order, with such a change in the setting angle κ1, not to change the cutting depth in an undesired manner, in the method according to the embodiment there occurs, coordinated with the controlled rotation of the tool body 1, a translational movement of the tool body in the plane XZ which runs perpendicular to the longitudinal axis L of the tool body 1. Here, the translational movement also has a direction component in the X direction, perpendicular to the workpiece axis Z.

The translational movement T, coordinated with the controlled rotation about the longitudinal axis L, of the tool body ensures that the setting angle κ1 can be changed without changing the position of the cutting corner with respect to the workpiece.

Figures 8, 9:
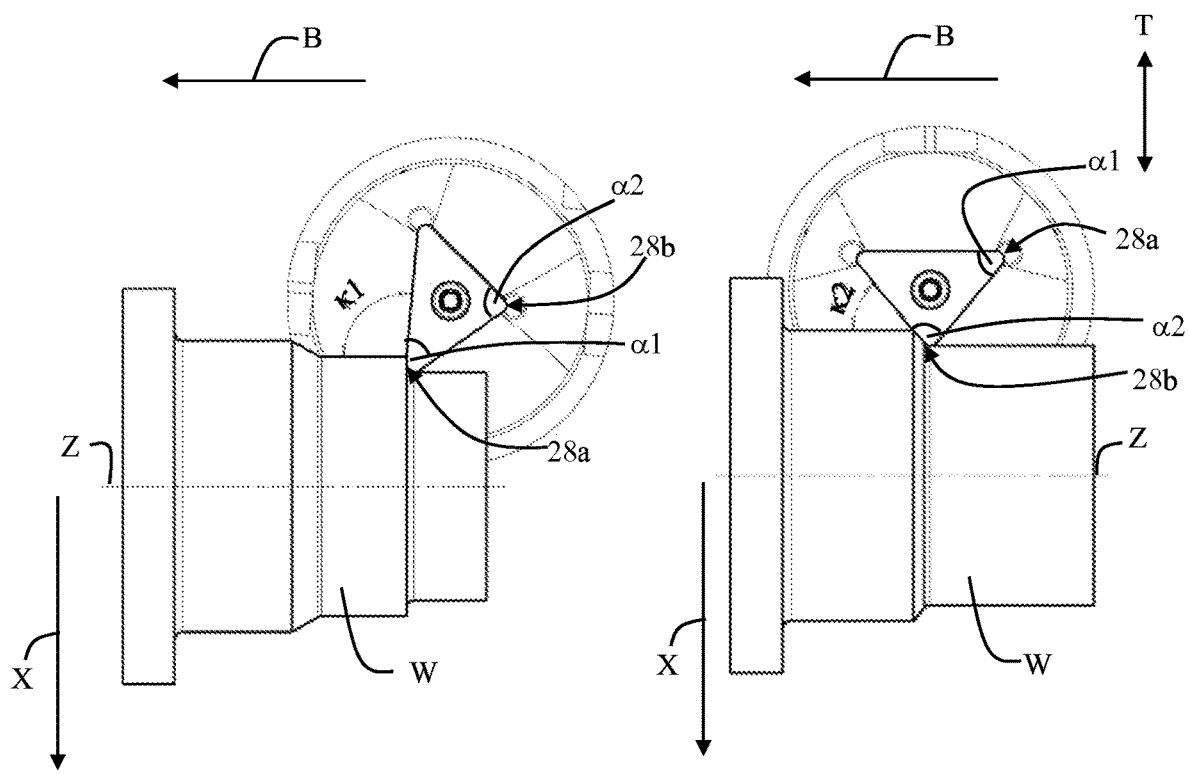
FIG. 8 shows an illustration, corresponding to FIG. 5, with a direction of view along the longitudinal axis of the tool body.
FIG. 9 shows a schematic illustration of the tool system with a direction of view along the longitudinal axis of the tool body, with the tool body rotated about the longitudinal axis with respect to FIG. 8.

Instead of the above-described change only in the setting angle κ1 at which the machining engagement of the cutting edge 26 with the workpiece W occurs, in the method the chip formation can also be changed by virtue of the fact that, instead of the first cutting corner 28a, controlled rotation of the tool body 1 about its longitudinal axis L brings the second cutting corner 28b, which is different than the first cutting corner 28a, into an active cutting position, as can be seen for example in FIG. 9. In this case, too, there occurs, coordinated with the controlled rotation of the tool body 1 by a predetermined angle, a translational movement T of the tool body 1 in the plane XZ, which runs perpendicular to the longitudinal axis L, with a translational movement component perpendicular to the workpiece axis Z. The coordinated translational movement T makes it possible to compensate for a change in the cutting depth which would otherwise follow as a result of a different radial distance of the first cutting corner 28a and the second cutting corner 28b from the longitudinal axis L of the tool body 1. As is schematically illustrated in FIG. 9, the turning with the second cutting corner 28b can occur for example with an orientation at another setting angle κ2 of the cutting edge in engagement.

By virtue of the controlled rotation of the tool body 1 by a predetermined angle about the longitudinal axis L and the translational movement T, coordinated therewith, in the plane XZ with a translational movement component in the direction perpendicular to the workpiece axis Z, the setting angle κ1, κ2 can thus be changed in a simple manner during the turning in order to change the chip formation. This can occur for example in combination with a change in the feed rate or of other parameters. Furthermore, by virtue of the controlled rotation of the tool body 1 by a predetermined angle about the longitudinal axis L and the translational movement, coordinated therewith, in the plane XZ with a translational movement component in the direction orthogonal to the workpiece axis Z, it is possible, even during the turning, for the cutting corner 28 in material engagement to be changed in a targeted manner and thus, instead of a first cutting corner 28a, for a second cutting corner 28b different therefrom to be brought into the active cutting position.

Although a description has been given with respect to the embodiment of an implementation in which the method is used with an interchangeable cutting insert 2 which has two different types of cutting corners 28a, 28b, the method can also be used if a cutting insert has a plurality of identical cutting corners 28.

Although an embodiment has been described in which a first cutting corner 28a and a second cutting corner 28b differ in their corner angle α1, α2, it is for example also possible that, alternatively thereto or additionally thereto, the cutting corners differ in the corner radius at which the respective cutting corners are designed to be curved.

Modifications

Some modifications of the above-described embodiment are described below, with only the differences in the interchangeable cutting inserts being described in detail and the same reference signs being used in each case. It goes without saying that the basic shape of the end face 13 of the tool body 1 is in each adapted to the shape and size of the changed cutting insert.

Only the differences in relation to the above-described embodiment will be described below, and the same reference signs will be used.

Figure 10:
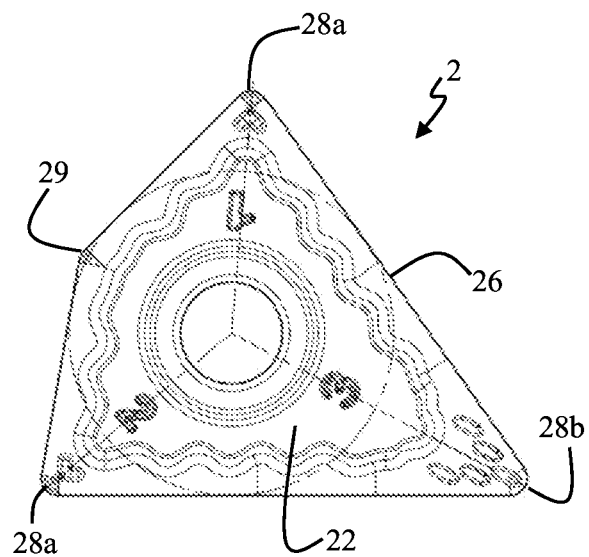
FIG. 10 shows a schematic illustration in plan view of a cutting insert according to a first modification.
Figure 11:
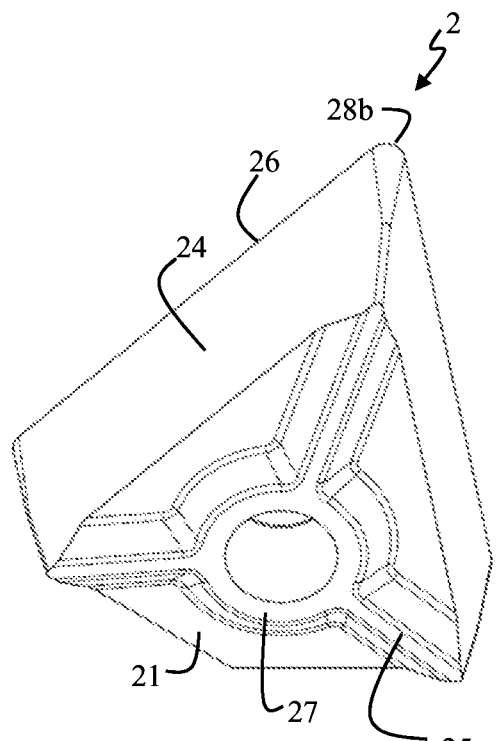
FIG. 11 shows a perspective illustration from below of the cutting insert according to the first modification.
Figure 12:
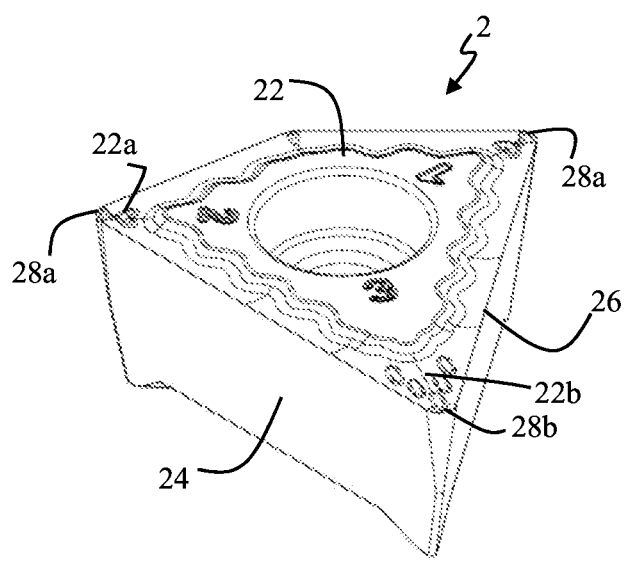
FIG. 12 shows a perspective illustration from above of the cutting insert according to the first modification.

FIG. 10 to FIG. 12 show a cutting insert 2 according to a first modification, in which cutting insert, in addition to three cutting corners 28a, 28b which can be used for machining, there is also provided a further corner 29, as can be seen in particular in FIG. 10. In the first modification, a first cutting corner 28a differs from a second cutting corner 28b in the configuration of the chip geometry structures 22a and 22b formed on the upper side 22 in the region of the respective cutting corner 28a, 28b, as can be seen in particular in FIG. 10 and FIG. 12. In the concretely illustrated example, the cutting corners additionally also differ in the corner angle and in the corner radius at which the cutting corners are formed. Alternatively thereto, however, it is also possible for example that the first cutting corner 28a and the second cutting corner 28b differ from one another only in the configuration of the chip geometry structures 22a, 22b and correspond in their other features.

Figure 13:
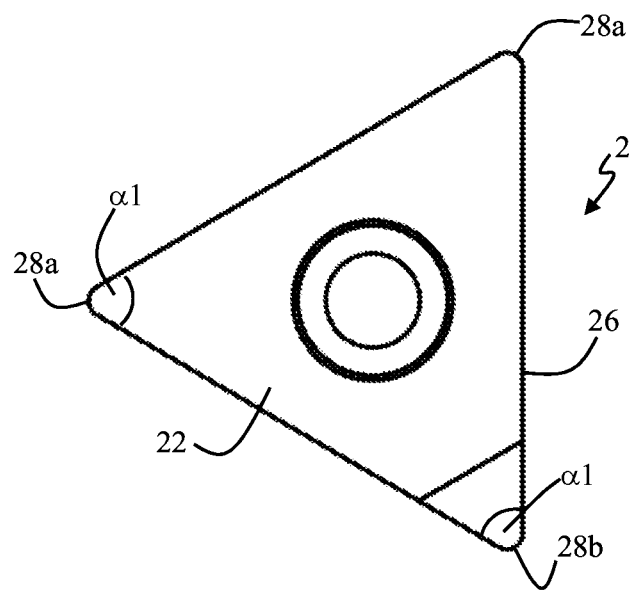
FIG. 13 shows a schematic illustration in plan view of a cutting insert according to a second modification.
Figure 14:
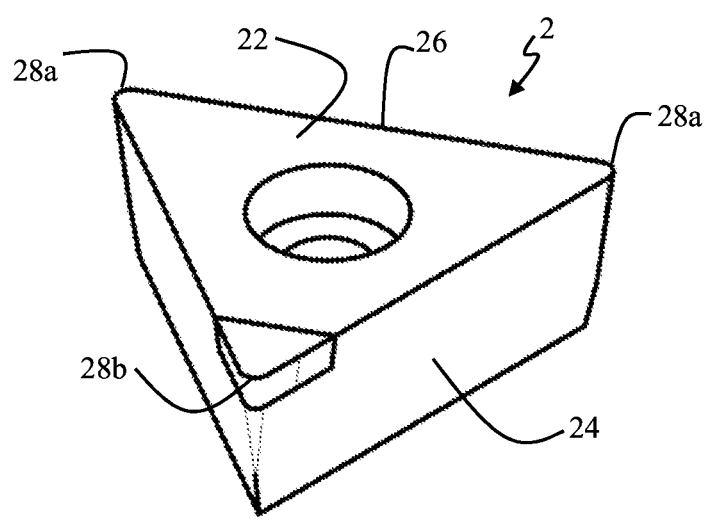
FIG. 14 shows a schematic perspective illustration of the cutting insert according to the second modification.

FIG. 13 and FIG. 14 show a cutting insert 2 according to a second modification, in which cutting insert a first cutting corner 28a and a second cutting corner 28b differ in material from which they are formed. In this example, the cutting corners 28a, 28b do indeed all have the same corner angle α1 and the same corner radius, but the material of the cutting corners differs from one another. For example, the cutting insert 2 can be formed from a hard metal (cemented carbide), and the second cutting corner 28b can be formed from another hard metal with different properties in terms of toughness, hardness, particle size, binder, etc. The second cutting corner 28b can, for example, also be formed from another hard material, such as in particular cermet, PCD (polycrystalline diamond), CVD diamond, CBN (cubic bornitride) or a cutting ceramic. As an alternative to such a formation from another material, the second cutting corner 28b can for example also be provided with only another coating than the first cutting corner 28a. Although only two different cutting corners 28a and 28b are shown in the example, it is also possible for example for more than two different cutting corners 28 to be provided, and/or the cutting corners 28a, 28b can additionally also differ from one another in further properties.

Figure 15:
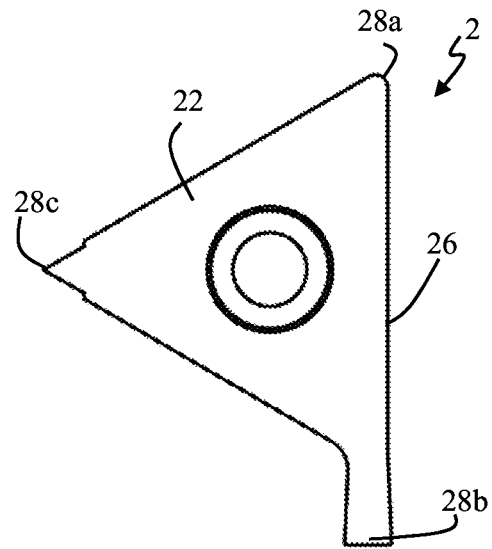
FIG. 15 shows a schematic illustration in plan view of a cutting insert according to a third modification.
Figure 16:
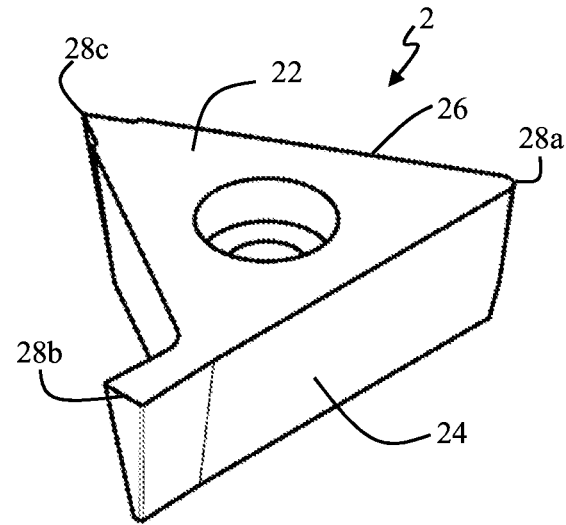
FIG. 16 shows a schematic perspective illustration of the cutting insert according to the third modification.

FIG. 15 and FIG. 16 show an interchangeable cutting insert 2 according to a third modification, in which cutting insert the different cutting corners are designed for different machining operations. As in the above-described configurations, a first cutting corner 28a is designed as a "normal" cutting corner for, for example, longitudinal turning as machining operation. In the third modification, a second cutting corner 28b is designed as a cutting corner for turning of forming a groove. In the third modification, a third cutting corner 28c is designed as a cutting corner for thread turning. In this case, the controlled rotation of the tool body 1 about its longitudinal axis L and the translational movement, coordinated therewith, of the tool body 1 in the plane XZ with a translational movement component orthogonal to the workpiece axis Z make it possible in the method to carry out different turning machining operations with the cutting insert 2 without a tool change in the machine tool being required for this purpose.

Figure 17:
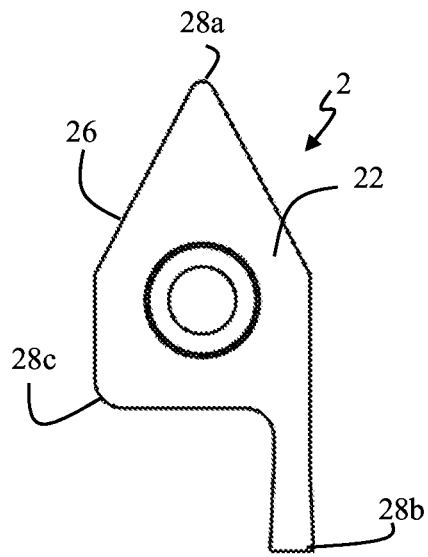
FIG. 17 shows a schematic illustration in plan view of a cutting insert according to a fourth modification.
Figure 18:
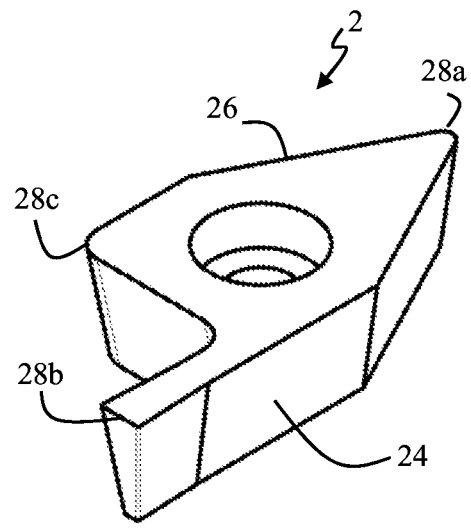
FIG. 18 shows a schematic perspective illustration of the cutting insert according to the fourth modification.

It is also the case in the fourth modification illustrated in FIG. 17 and FIG. 18 that a first cutting corner 28a is designed as a "normal" cutting corner for, for example, longitudinal turning and a second cutting corner 28b is designed as a cutting corner for groove turning. However, by contrast with the above-described third modification, a third cutting corner 28c is also formed as a "normal" cutting corner which, however, has a corner angle other than the first cutting corner 28a. Furthermore, the basic shape of the cutting insert 2 according to the fourth modification differs from the basic shape of the cutting insert 2 according to the third modification, as can be seen in FIG. 17 and FIG. 18.

Figures 19, 20:
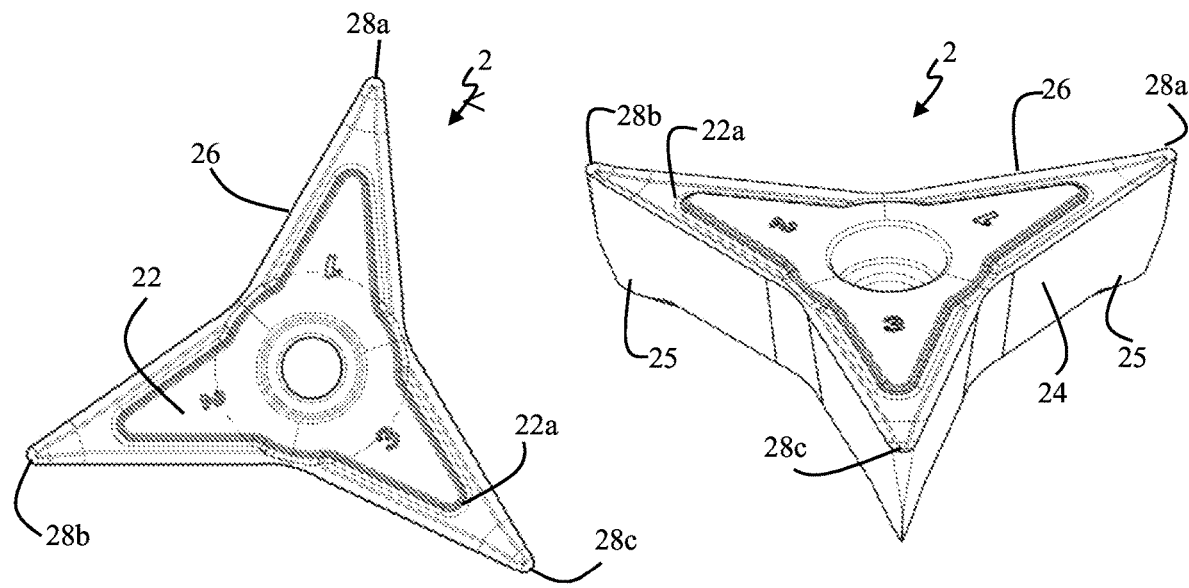
FIG. 19 shows a schematic perspective illustration in plan view of a cutting insert according to a fifth modification.
FIG. 20 shows a schematic perspective illustration of the cutting insert according to the fifth modification.
Figure 21:
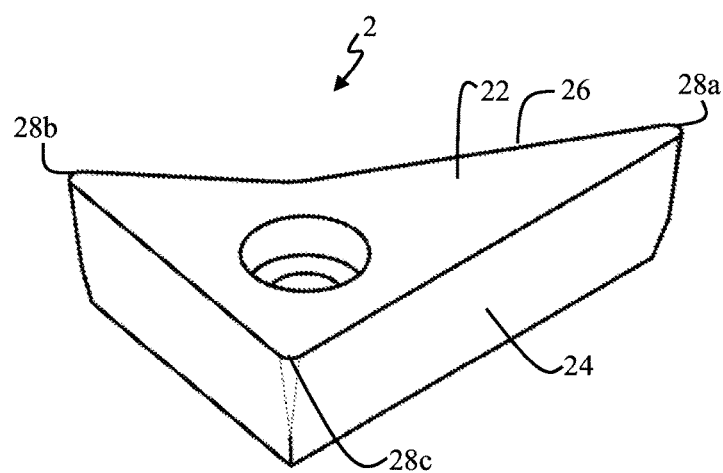
FIG. 21 shows a schematic perspective illustration of a cutting insert according to a sixth modification.
Figure 22:
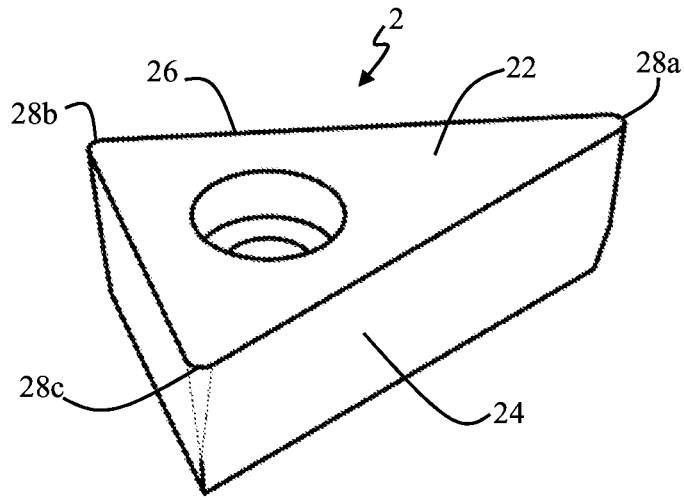
FIG. 22 shows a schematic perspective illustration of a cutting insert according to a seventh modification.
Figure 23:
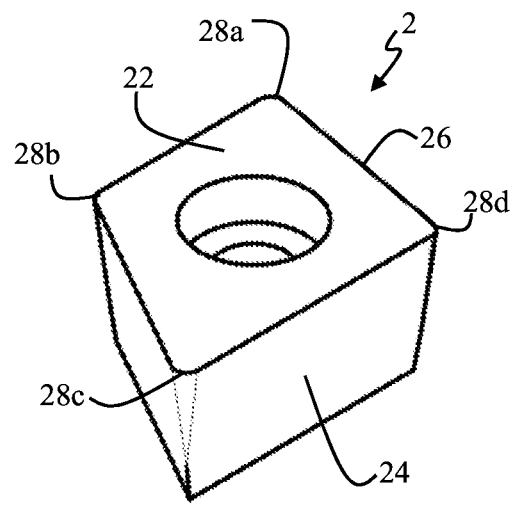
FIG. 23 shows a schematic perspective illustration of a cutting insert according to an eighth modification.
Figure 24:
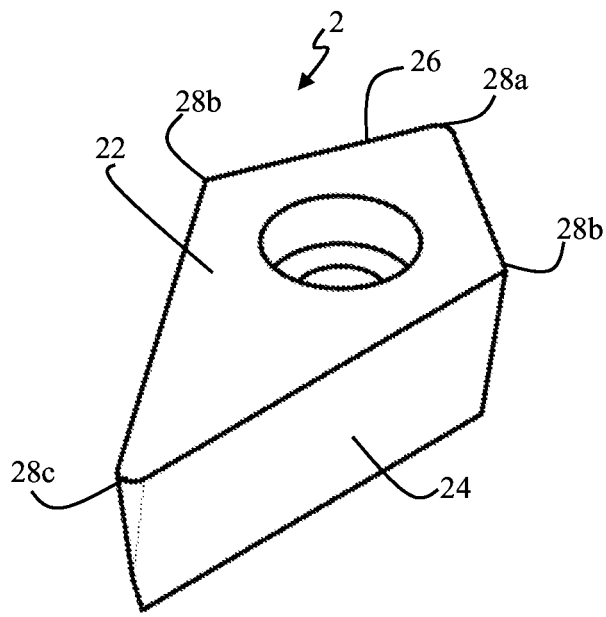
FIG. 24 shows a schematic perspective illustration of a cutting insert according to a ninth modification.

A fifth modification of a cutting insert 2 which can be used in the method described is shown in FIG. 19 and FIG. 20. In the fifth modification, the cutting insert 2 has in turn a total of three cutting corners 28a, 28b, 28c which can be used for turning and which, in this case, are designed for example to be identical to one another. In this modification, the cutting insert 2 has in plan view the shape of a three-pointed star. As an alternative to the identical design of the three usable cutting corners 28a, 28b, 28c, the cutting corners can for example also be provided with different reinforcing bevels which each extend at least in the region of the cutting corner and the cutting edge portions adjoining the latter. For example, these reinforcing bevels can differ in their width (measured perpendicularly to the cutting edge) or in their angle (measured with respect to a plane perpendicular to the main direction of extent of the upper side 22). In this case, too, the different cutting corners can be used for, for example, the turning of the different materials or for turning with different machining parameters. It should be noted that for example different such reinforcing bevels are not limited to the basic shape of the cutting insert 2 that is shown in FIG. 19 and FIG. 20, but can also be provided with other basic shapes and in combination also with further differences between the cutting corners 28a, 28b, 28c.

FIG. 21 to FIG. 24 schematically illustrate further modifications of cutting inserts 2 which each have at least two cutting corners 28a, 28b which differ from one another. It should be noted that, in addition to the illustrated differences in the corner angles, further differences between the cutting corners can also be provided in turn.

Figure 25:
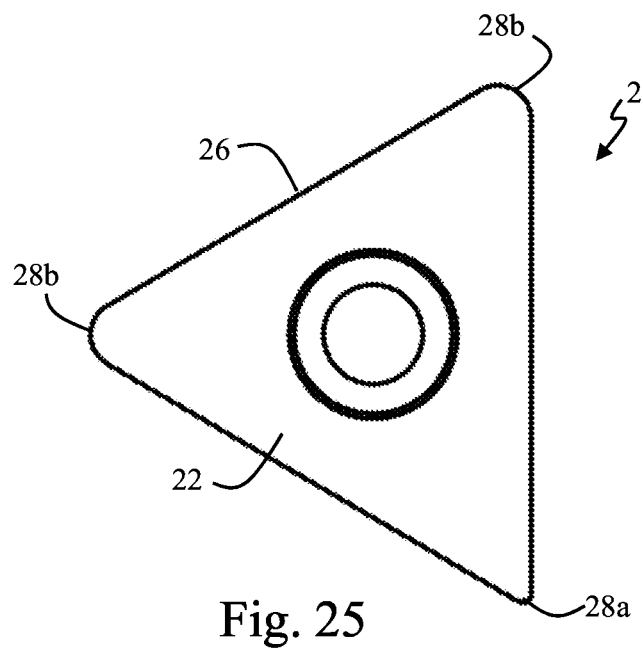
FIG. 25 shows a schematic illustration in plan view of a cutting insert according to a tenth modification.
Figure 26:
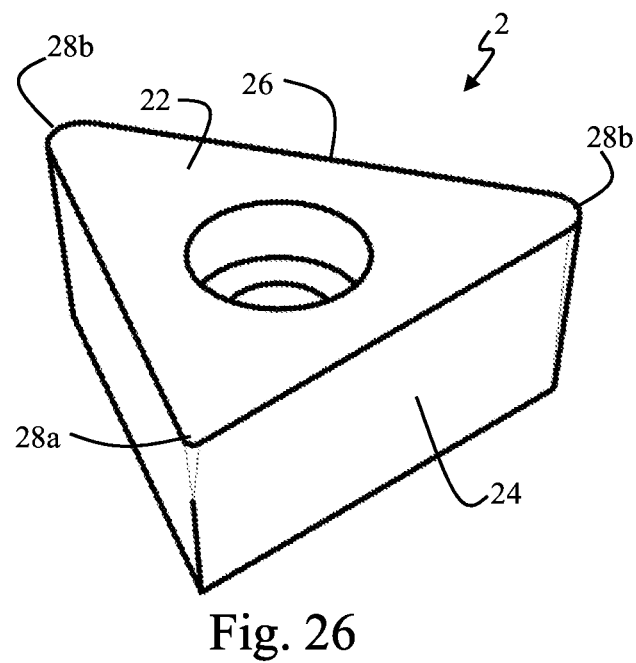
FIG. 26 shows a schematic perspective illustration of a cutting insert according to a tenth modification.

In the cutting insert 2 according to a tenth modification which is shown in FIG. 25 and FIG. 26, the cutting insert 2 has overall a substantially triangular shape in which the cutting corners all have the same corner angle. In this embodiment, a first cutting corner 28a is formed with a small corner radius for, for example, finish machining, whereas the other cutting corners as second cutting corners 28b are formed with a larger corner radius for, for example, rough machining.

Although the above-described anti-rotation safeguarding elements and centering elements on the underside 21 of the cutting insert 2 are not shown with respect to all modifications, these elements can also preferably be provided in the modifications.

It should be noted that, in the case of the cutting inserts 2, any desired combinations of the above-described differences between respective cutting corners 28 are possible.

The invention claimed is:

1. A method for turning a workpiece with a tool system having an interchangeable cutting insert disposed on an end face of a tool body in a rotationally fixed manner in such a way that an upper side of the interchangeable cutting insert configured as a rake face is oriented perpendicularly to a longitudinal axis of the tool body, and a cutting edge formed between the upper side and a peripheral lateral face of the interchangeable cutting insert projects in a radial direction with respect to the longitudinal axis beyond an outer circumference of the end face of the tool body by way of at least two usable cutting corners and cutting edge portions adjoining the at least two usable cutting corners on both sides, the method comprises the following steps of:

rotating the workpiece about a workpiece axis;

machining a surface of the workpiece with a first cutting corner in such a way that chips generated run off on the upper side of the interchangeable cutting insert; and changing a chip formation by controlled rotation of the tool body about the longitudinal axis and translational movement, coordinated therewith, of the tool body in a plane, which runs perpendicularly to the longitudinal axis, with a translational movement component perpendicular to the workpiece axis, whereby instead of the first cutting corner, a second cutting corner of the interchangeable cutting insert is now brought into an active cutting position.

2. The method according to claim 1, wherein the longitudinal axis of the tool body is oriented in a plane perpendicular to the workpiece axis.

3. The method according to claim 1, wherein the first cutting corner is different from the second cutting corner.

4. The method according to claim 1, wherein the controlled rotation of the tool body about the longitudinal axis and the translational movement, coordinated therewith, occur in such a way that a setting angle of an active machining cutting edge is changed.

5. The method according to claim 1, wherein the controlled rotation of the tool body and the translational movement, coordinated therewith, occur in such a way that a workpiece contour remains unchanged during the machining.

6. The method according to claim 1, wherein, during the machining, an active cutting corner is disposed in a plane which contains the workpiece axis.

7. A method of using an interchangeable cutting insert having an upper side configured as a rake face, an underside configured as a bearing face, a peripheral lateral face serving as a flank, and a cutting edge, which is formed between the upper side and the peripheral lateral face, and having with at least two cutting corners which can be used for machining and cutting edge portions adjoining the at least two cutting corners on both sides in each case, the method which comprises the steps of:

placing the interchangeable cutting insert on a tool body;

rotating a workpiece about a workpiece axis;

machining a surface of the workpiece with a first cutting corner in such a way that chips generated run off on the upper side of the interchangeable cutting insert; and changing a chip formation by controlled rotation of the tool body about its longitudinal axis and translational movement, coordinated therewith, of the tool body in a plane, which runs perpendicularly to the longitudinal axis, with a translational movement component perpendicular to the workpiece axis, whereby instead of the first cutting corner, a second cutting corner of the interchangeable cutting insert is now brought into an active cutting position.

8. The method according to claim 7, wherein the underside of the interchangeable cutting insert has at least one anti-rotation safeguarding element which interacts in a form-fitting manner with a complementary anti-rotation safeguarding element on an end face of the tool body.

9. The method according to claim 7, wherein the underside of the interchangeable cutting insert has at least one centering element which interacts in a form-fitting manner with the end face of the tool body in order to position the interchangeable cutting insert with respect to the longitudinal axis of the tool body.

* * * * *